United States Patent
Lee et al.

(10) Patent No.: US 9,341,709 B2
(45) Date of Patent: May 17, 2016

(54) IMAGE SENSING DEVICE AND FOCAL PLANE ARRAY DEVICE USING FREQUENCY CONVERSION FOR REAL-TIME TERAHERTZ IMAGING

(71) Applicant: KOREA ADVANCED INSTITUTE OF SCIENCE AND TECHNOLOGY, Yuseong-gu, Daejeon (KR)

(72) Inventors: Sang-Gug Lee, Daejeon (KR); Sun-A Kim, Daejeon (KR); Kyoung-Young Choi, Daejeon (KR); Dae-Woong Park, Daejeon (KR); Seok-Kyun Han, Daejeon (KR)

(73) Assignee: Korea Advanced Institute of Science and Technology, Yuseong-Gu, Daejeon (KR)

( * ) Notice: Subject to any disclaimer, the term of this patent is extended or adjusted under 35 U.S.C. 154(b) by 0 days.

(21) Appl. No.: 14/489,564

(22) Filed: Sep. 18, 2014

(65) Prior Publication Data
US 2015/0201137 A1    Jul. 16, 2015

(30) Foreign Application Priority Data

Jan. 10, 2014  (KR) .................. 10-2014-0003260
May 12, 2014  (KR) .................. 10-2014-0056538

(51) Int. Cl.
| | | |
|---|---|---|
| H04N 5/33 | (2006.01) | |
| G01S 7/481 | (2006.01) | |
| G01J 3/42 | (2006.01) | |
| G01S 13/88 | (2006.01) | |

(52) U.S. Cl.
CPC ................. *G01S 7/4816* (2013.01); *G01J 3/42* (2013.01); *G01S 13/887* (2013.01)

(58) Field of Classification Search
CPC ............... G01J 5/20; G01J 2005/0077; G01N 21/3581; H04N 5/332; H04N 5/23241; H04N 5/3698; H04N 5/357
See application file for complete search history.

(56) References Cited

U.S. PATENT DOCUMENTS

| | | | | |
|---|---|---|---|---|
| 5,493,719 | A * | 2/1996 | Smith et al. | 455/325 |
| 2002/0067480 | A1* | 6/2002 | Takahashi | 356/317 |
| 2012/0062286 | A1* | 3/2012 | Ginsburg et al. | 327/148 |
| 2012/0153148 | A1* | 6/2012 | Federici et al. | 250/332 |
| 2014/0118037 | A1* | 5/2014 | Chen et al. | 327/145 |
| 2014/0166868 | A1* | 6/2014 | Tekin et al. | 250/252.1 |

FOREIGN PATENT DOCUMENTS

| | | |
|---|---|---|
| KR | 1020070005874 A | 1/2007 |
| KR | 1020100018301 A | 2/2010 |
| KR | 10-2012-0115634 A | 10/2012 |

OTHER PUBLICATIONS

Korean Office Action issued in corresponding Korean Application No. 10-2014-0056538 mailed May 17, 2015.

* cited by examiner

*Primary Examiner* — Marcus Taningco
(74) *Attorney, Agent, or Firm* — Davis & Bujold PLLC; Michael J. Bujold

(57) ABSTRACT

Provided is an image sensing device that includes a detector configured to detect a terahertz wave signal received by a receiving antenna, a voltage-controlled oscillator configured to output an oscillation frequency according to an output voltage of the detector, and a frequency digital converter configured to convert the oscillation frequency output from the voltage-controlled oscillator to a digital signal.

15 Claims, 4 Drawing Sheets

IMAGE SENSING DEVICE AND FOCAL PLANE ARRAY DEVICE USING FREQUENCY CONVERSION FOR REAL-TIME TERAHERTZ IMAGING

CROSS-REFERENCE TO RELATED APPLICATION(S)

This application claims the benefit under 35 U.S.C. §119 (a) of Korean Patent Application No. 10-2014-0003260, filed on Jan. 10, 2014, and No. 10-2014-0056538, filed on May 12, 2014 in the Korean Intellectual. Property Office, the entire disclosure of which is incorporated herein by reference for all purposes.

BACKGROUND

1. Field

The present invention relates to an image sensing device and a focal plane array device using frequency conversion for realizing terahertz imaging that can be used in security search, inspection of manufactured food, or biomedical diagnosis of a cancer image.

2. Description of the Related Art

A terahertz camera using a terahertz wave having two characteristics of a transmissivity of an electromagnetic wave and a directivity property of a light wave can be used in a medical or security field.

As an antenna for terahertz image sensing using a CMOS technology, a patch antenna is mainly used to prevent a loss to a silicon substrate. Since a size of the patch antenna is inverse proportion to a frequency of an input signal, when a signal of a sub-terahertz band is used, the antenna has a relatively large size of hundreds of micrometers. However, in order to obtain a high-resolution image, since it is necessary to decrease a size of a pixel, there has been developed a technology in which the frequency of the signal is increased to reduce the size of the antenna.

A system requiring high-sensitivity reception generally uses a lock-in amplifier. At this time, a reference signal source is used in order to increase reception sensitivity by using the lock-in amplifier. Since sizes of an analog and digital converter and a lock-in amplifier according to the related art are too large to be integrated into a CMOS circuit, they may be currently realized using an off-chip circuit or separate equipment.

A background technology of the present invention is disclosed in Korean Patent Publication No. 10-2012-0115634 filed on Oct. 19, 2012.

An object of the present invention is to provide an image sensing device and a focal plane array imaging device for high-resolution real-time terahertz imaging.

Other objects and features of the present invention will be understood through the following description, and will be apparent from by embodiments of the present invention. Further, it is appreciated that the objects and features of the present invention may be implemented by means of the claims and a combination of means.

SUMMARY

In one general aspect, there is provided an image sensing device using frequency conversion for real-time terahertz imaging. The image sensing device includes a detector configured to detect a terahertz wave signal received by a receiving antenna, a voltage-controlled oscillator configured to output an oscillation frequency according to an output voltage of the detector, and a frequency digital converter configured to convert the oscillation frequency output from the voltage-controlled oscillator to a digital signal.

The image sensing device may further include a regulator configured to regulate a gain of the voltage-controlled oscillator by regulating the output voltage applied to the voltage-controlled oscillator.

The regulator may be configured to regulate the output voltage to raise the gain of the voltage-controlled oscillator when it is necessary to increase output sensitivity, and to regulate the output voltage to lower the gain of the voltage-controlled oscillator when it is necessary to reduce noise sensitivity.

The gain of the voltage-controlled oscillator may be a value of (frequency control range)/(voltage control range).

When the detector is a field effect transistor, a drain of the field effect transistor may be connected to the voltage-controlled oscillator, a voltage source which is the regulator may be connected between a source of the field effect transistor and a ground, and the gain of the voltage-controlled oscillator may be adjusted according to a regulation voltage output from the voltage source.

The voltage-controlled oscillator may be realized in a ring form in which a plurality of delay cells is connected in series.

The image sensing device may further include a clock generating unit configured to input, to the detector, a first control signal which allows a DC output voltage by the received terahertz wave signal, to be generated and a second control signal which does not allow the DC output voltage by the received terahertz wave signal to be generated for a time during which a set having the receiving antenna and the detector is operated, and a digital signal processor configured to generate data on the basis of a difference value between a first oscillation frequency generated by the voltage-controlled oscillator while the first control signal is input to the detector and a second oscillating frequency generated by the voltage-controlled oscillator while the second control signal is input to the detector.

In another aspect, there is provided a focal plane array imaging device using frequency conversion for real-time terahertz imaging. The focal plane array imaging device includes an antenna-detector array in which a plurality of sets each having a receiving antenna configured to receive a terahertz wave signal and a detector configured to detect the terahertz wave signal received by the receiving antenna is arranged, column and row drivers which are able to turn on/off at least one of the plurality of sets, a voltage-controlled oscillator configured to output an oscillation frequency according to an output voltage from the set, a frequency digital converter configured to convert the oscillation frequency output from the voltage-controlled oscillator to a digital signal, and a digital signal processor configured to generate data on the basis of the converted digital signal.

The focal plane array imaging device may further include a clock generating unit configured to generate clocks for operations of circuits included in the focal plane array imaging device, and to control operation timings of the respective circuits.

The clock generating unit may be configured to input, to the detector included in a single set, a first control signal which allows a DC output voltage by the received terahertz wave signal to be generated and a second control signal which does not to allow the DC output voltage by the received terahertz wave signal to be generated for a time during which the single set is operated, and the digital signal processor is configured to generate data on the basis of a difference value between a first oscillation frequency generated by the voltage-controlled oscillator while the first control signal is input to the detector and a second oscillating frequency generated by the volt age-controlled oscillator while the second control signal is input to the detector.

When the detector is a field effect transistor, the first control signal and the second control signal may be bias voltages.

The focal plane array imaging device may further include a regulator configured to be able to regulate a gain of the voltage-controlled oscillator by regulating the output voltage applied to the voltage-controlled oscillator.

The regulator may be configured to regulate the output voltage to raise the gain of the voltage-controlled oscillator when it is necessary to increase output sensitivity, and to regulate the output voltage to lower the gain of the voltage-controlled oscillator when it is necessary to reduce noise sensitivity.

The gain of the voltage-controlled oscillator may be a value of (frequency control range)/(voltage control range).

When the detector is a field effect transistor, a drain of the field effect transistor may be connected to the voltage-controlled oscillator, a voltage source which is the regulator may be connected between a source of the field effect transistor and a ground, and the gain of the voltage-controlled oscillator may be adjusted according to a regulate voltage output from the voltage source.

DETAILED DESCRIPTION

Figure 1:
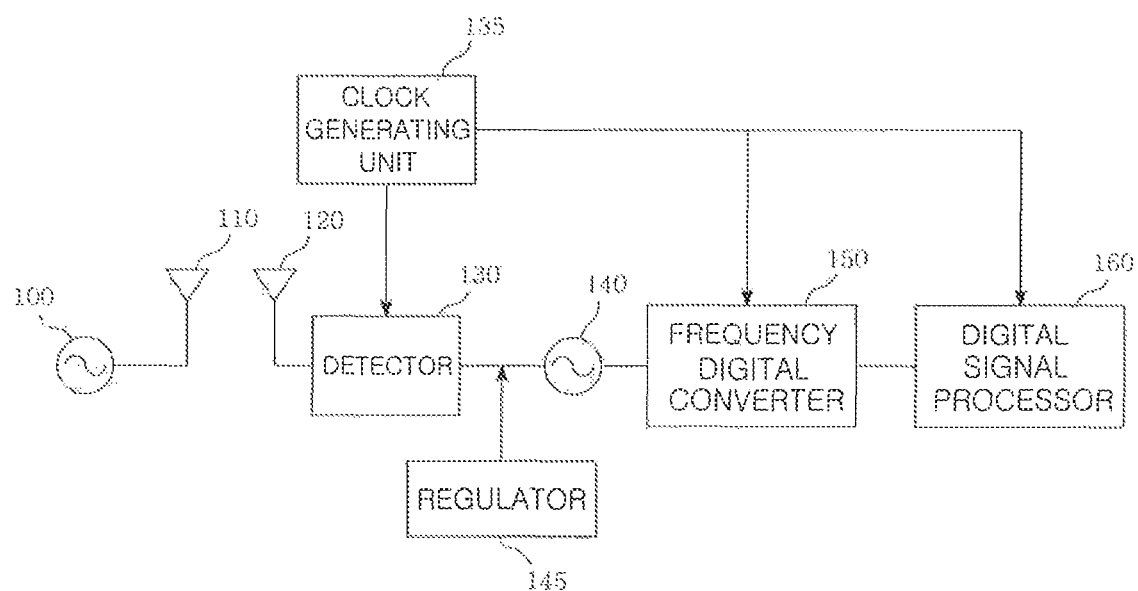
FIG. 1 is a diagram for describing an image sensing device according to an embodiment of the present invention.

Hereinafter, embodiments of the present invention will be described in detail with reference to the accompanying drawings to allow those skilled in the art to easily implement the embodiments. However, the present invention may be implemented in various forms, and is not limited to the embodiments described herein. Further, parts that are not related to the description are not illustrated in the drawings, and similar parts are assigned similar reference numerals throughout the specification.

Throughout the specification, it will be further understood that the terms "comprises," "comprising," "includes," and "including" mean that one part further includes other parts, but do not exclude other parts, unless the context clearly indicates otherwise. Further, the terms "unit," "device," and "module" means a unit for processing at least one function or operation, and may implemented by hardware, software, or a combination of hardware and software.

FIG. 1 is a diagram for describing an image sensing device according to an embodiment of the present invention.

Referring to FIG. 1, the image sensing device includes a receiving antenna 120, a detector 130, a clock generating unit 135, a voltage-controlled oscillator 140, a frequency digital converter 150, and a digital signal processor 160.

The receiving antenna 120 is configured to receive a terahertz wave signal which is generated in a terahertz signal source 100 and is transmitted by a transmitting antenna 110.

The detector 130 is configured to detect the received terahertz wave signal received by the receiving antenna. For example, the detector 130 may be a broadband diode or a field effect transistor (FET).

The clock generating unit 135 is configured to generate clocks for operations of circuits included in a focal plane array imaging device, and to control operation timings of the respective circuits.

For example, when it is assumed that a single set ('corresponding to a single pixel') includes the receiving antenna 120 and the detector 130, the clock generating unit 135 may input a first control signal and a second control signal to the detector 130 for a time during which the single set is operated. Here, the first control signal is a signal that allows a DC output voltage by the received terahertz wave signal to be generated, and the second control signal is a signal that does not allow the DC output voltage by the received terahertz wave signal to be generated. Here, a power is constantly applied to the detector 130 for the operating time of the single set, the first control signal means a signal that controls the detector 130 to generate the DC output voltage by the received terahertz wave signal, and the second control signal means a signal that controls the detector not to generate the DC output voltage by the received terahertz wave signal. For example, when the detector 130 is the field effect transistor, a first control voltage and a second control voltage may be bias voltages. The operating time means a time taken to turn off a set corresponding to a single pixel from turning on the set. The operating time is referred to as a scanning time.

The voltage-controlled oscillator 140 may output an oscillation frequency according to an output voltage of the detector 130.

A regulator 145 may regulate the output voltage applied to the voltage-controlled oscillator 140 to regulate a gain of the voltage-controlled oscillator. The gain KVCO of the voltage-controlled oscillator is a value of (frequency control range)/(voltage control range).

When a state of a system needs to increase output sensitivity, the regulator 145 may regulate the output voltage applied to the voltage-controlled oscillator 140 so as to raise the gain of the voltage-controlled oscillator. Thus, since a change of an output frequency of the voltage-controlled oscillator 140 is increased even though a change of the output voltage is small, the output sensitivity is increased.

Meanwhile, when it is necessary to reduce noise sensitivity, the regulator 145 may regulate the output voltage applied to the voltage-controlled oscillator 140 so as to lower the gain of the voltage-controlled oscillator. Thus, since the change of the output frequency of the voltage-controlled oscillator 140 is not large even through the change of the output voltage is small, the output does not sensitively respond to noise.

The output voltage may be manually regulated by a user, or may be automatically regulated by an algorithm.

It is possible to detect terahertz wave signal to convert the detected terahertz wave signal into a frequency signal in an optimal state suitable for the state of the system by regulating the output voltage applied to the voltage-controlled oscillator 140.

The frequency digital converter 150 may convert the oscillation frequency output from the voltage-controlled oscillator 140 into a digital signal. The frequency digital converter 150 may be realized using, for example, a counter.

The digital signal processor 160 may generate data on the basis of the converted digital signal.

The digital signal processor 160 may generate data on the basis of a difference value between a first oscillation frequency generated in the voltage-controlled oscillator while the first control signal is input to the detector and a second oscillation frequency generated in the voltage-controlled oscillator while the second control signal is input to the detector. The first oscillation frequency and the second oscillation frequency generated in the voltage-controlled oscillator 140 may be converted into the digital signals by the frequency digital converter 150, and may be input to the digital signal processor 160.

Since the image sensing device converts the terahertz wave signal into the frequency signal and converts the frequency signal into the digital signal, a small-area image sensor can be realized, so that an area of a unit pixel can be reduced. Accordingly, it is possible to realize a high-resolution terahertz image sensing device.

Further, since additional equipment such as a lock-in amplifier for high-sensitivity reception is not needed, it is possible to remarkably decrease a size of the device, and it is possible to reduce manufacturing cost.

Furthermore, a signal output from the detector is converted into a high frequency having no 1/f noise by using the voltage-controlled oscillator, so that it is possible to obtain the output having noise resistance against 1/f noise.

Moreover, since image data is generated based on the difference value between the oscillation frequencies generated according to the control signals input during a sampling time, the Image data may not be affected by noise that may be generated by frequency drift generated in the voltage-controlled oscillator even when the input signals are constant.

Figure 2:
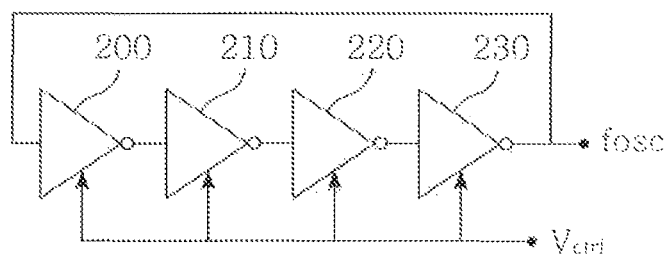
FIG. 2 is a diagram for describing a voltage-controlled oscillator according to an embodiment of the present invention.

FIG. 2 is a diagram for describing a voltage-controlled oscillator according to an embodiment of the present invention.

Referring to FIG. 2, the voltage-controlled oscillator may be a ring voltage-controlled oscillator realized as a ring form in which a plurality of delay cells is connected in series. The delay cell may be realized using, for example, inverters 200, 210, 220 and 230 or a differential delay cell.

The delay cell is realized so as to control a RC time constant by controlling a current by an applied voltage.

Thus, the voltage-controlled oscillator including the plurality of delay cells receives an output voltage Vctrl of the detector to output an oscillation frequency $f_{osc}$.

Figure 3:
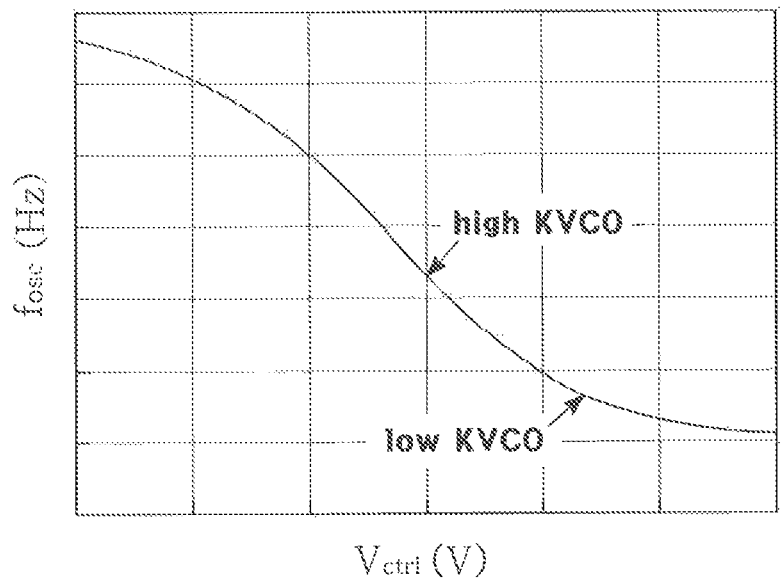
FIG. 3 is a graph for describing a gain KVCO of the voltage-controlled oscillator.

FIG. 3 is a graph for describing a gain KVCO of the voltage-controlled oscillator.

FIG. 3 illustrates a curved line of an output frequency $f_{osc}$ with a control voltage Vctrl of the voltage-controlled oscillator. The gain KVCO of the voltage-controlled oscillator is a value of (frequency control range)/(voltage control range).

Accordingly, an incline of the curved line of FIG. 3 is a value of the gain KVCO of the voltage-controlled oscillator with respect to the control voltage Vctrl according to definition of the gain KVCO of the voltage-controlled oscillator. A portion where the incline of the curved line is high is a high KVCO portion, and a portion where the incline of the curved line is low is a low KVCO portion.

When the state of the system needs to increase output sensitivity, the output voltage applied to the voltage-controlled oscillator can be regulated (the output voltage can be moved to the High KVCO portion) so as to raise the gain of the voltage-controlled oscillator.

Meanwhile, when it is necessary to reduce the noise sensitivity, the output voltage applied to the voltage-controlled oscillator can be regulated (the output voltage can be moved to the low KVCO portion) so as to lower the gain of the voltage-controlled oscillator.

In this way, the voltage-controlled oscillator can output the oscillation frequency in an optimal state by regulating the output voltage to be suitable for the state of the system.

Figure 4:
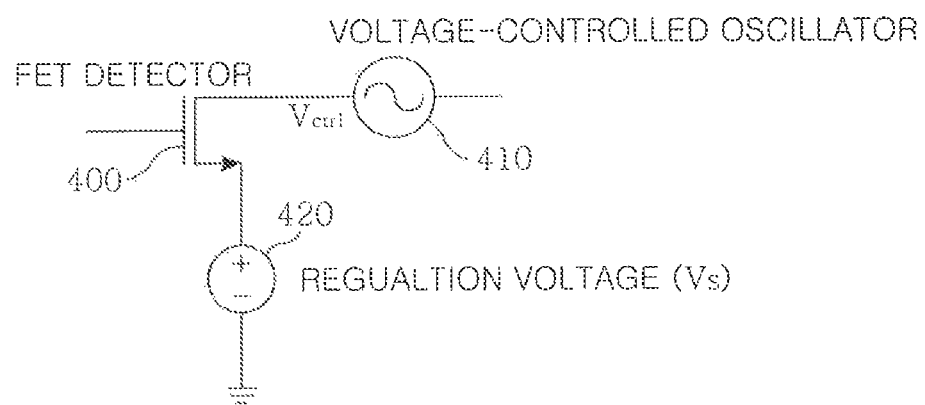
FIG. 4 is a diagram for describing a regulator according to an embodiment of the present invention.

FIG. 4 is a diagram for describing a regulator according to an embodiment of the present invention.

Referring to FIG. 4, when the detector is a field effect transistor 400, a drain of the field effect transistor 400 may be connected to a voltage-controlled oscillator 410, and a voltage source which is a regulator 420 may be connected between a source of the field effect transistor 400 and a ground.

When the field effect transistor 400 is turned on by a gate voltage, a drain voltage Vctrl of the field effect transistor 400 in which a current does not flow is almost the same as a regulation voltage Vs applied to the source.

$$\text{Drain voltage Vctrl} = \text{Regulation voltage } V_s + \Delta V$$

$\Delta V$ is a DC output voltage generated by a terahertz wave signal. The $\Delta V$ has a level that is considerably smaller than that of the regulation voltage $V_s$. For example, the $\Delta V$ may have a value ranging from several uV to hundreds of uV, but is not limited to the value.

Accordingly, the control voltage Vctrl of the voltage-controlled oscillator 140 is determined by regulating the regulation voltage $V_s$. In this way, an operation point of the voltage-controlled oscillator is changed by regulating the voltage of the regulating voltage source connected between the source and the ground, so that it is possible to operate the voltage-controlled oscillator 410 at a desired KVCO value.

When the detector 400 is the field effect transistor, the first control signal and the second control signal generated in the clock generating unit (not illustrated) may be bias voltages.

When the first control signal that allows the DC output voltage by the received terahertz wave signal to be generated is input to the detector 400, the control voltage Vctrl of the voltage-controlled oscillator 410 is 'regulation voltage $V_s + \Delta V$.' Meanwhile, when the second control signal that does not allow the DC output voltage by the received terahertz wave signal to be generated is input to the detector 400, the control voltage Vctrl of the voltage-controlled oscillator 410 is 'regulation voltage $V_s$.'

Thus, a difference value between the first oscillation frequency generated in the voltage-controlled oscillator 140 while the first control signal is input to the detector and the second oscillation frequency generated in the voltage-controlled oscillator 140 while the second control signal is input to the detector is '$\Delta f$.' Here, the $\Delta f$ may be a difference value between the output frequencies generated by the $\Delta V$ which is the difference value between the control voltage Vs+$\Delta V$ when the first control signal is input and the control voltage $V_s$ when the second control signal is input.

Figure 5:
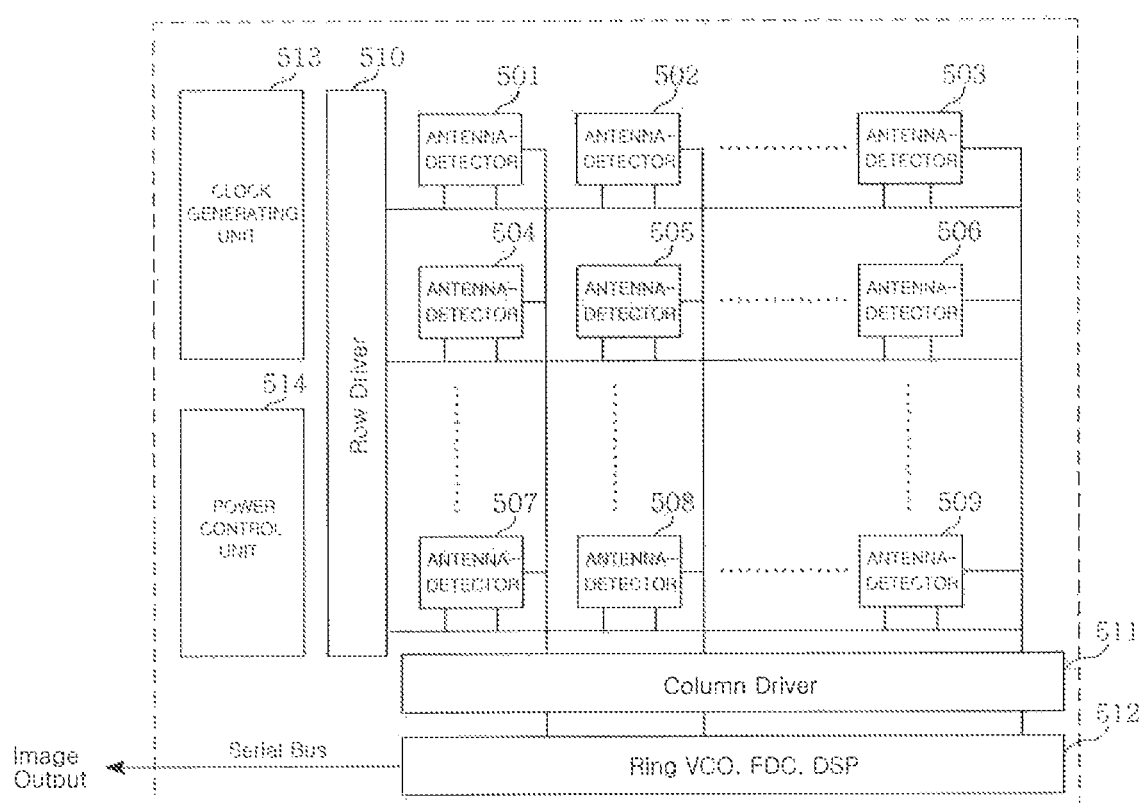
FIG. 5 is a diagram for describing a focal plane array imaging device accord in to an embodiment of the present invention.

FIG. 5 is a diagram for describing a focal plane array imaging device according to an embodiment of the present invention.

Referring to FIG. 5, the focal plane array imaging device includes antenna-detector arrays 501, 502, 503, 504, 505, 506, 507, 508 and 509, a row driver 510, a column driver 511, a voltage-controlled oscillator, a frequency digital converter, a digital signal, processor, a clock generating unit 513, and a power control unit 514.

The antenna-detector arrays 501, 502, 503, 504, 505, 506, 507, 508 and 509 mean that sets each having a receiving antenna configured to receive a terahertz wave signal and a detector configured to detect the terahertz wave signal received by the receiving antenna are arranged in matrix. That is, the receiving antenna and the detector are included in a single set, and the array means that the single set is arranged in plural number.

The row driver 510 and the column driver 511 may turn on or off at least one set of the antenna-detector arrays. The drivers 510 and 511 and the antenna-detector arrays may be electrically connected.

The voltage-controlled oscillator, the frequency digital converter and the digital signal processor are represented as one block 512.

The voltage-controlled oscillator outputs the oscillation frequency according to the output voltage output from the set. The frequency digital converter converts the oscillation frequency output from the voltage-controlled oscillator into the digital signal. The digital signal processor generates data on the basis of the converted digital signal to output the generated data.

The clock generating unit 513 may generate clocks for operations of circuits included in the focal plane array imaging device, and control operation timings of the respective circuits.

The antenna-detector arrays in which a plurality of sets each having the receiving antenna 120 and the detector 130 is arranged will be described below. The clock generating unit 513 may input the first control signal and the second control signal to the detector included in the single set for a time during which the single set is sampled. The first control signal is a signal that allows the detector to generate the DC output voltage by the received terahertz wave signal, and the second control signal is a signal that does not allow the detector to generate the DC output voltage by the received terahertz wave signal.

The power control unit 514 may supply the power to the circuits included in the focal plane array imaging device.

The regulator (not illustrated) may regulate the output voltage applied to the voltage-controlled oscillator to regulate the gain of the voltage-controlled oscillator. The description related to the regulator has been already presented, and, thus, the description thereof will not be presented.

Figure 6:
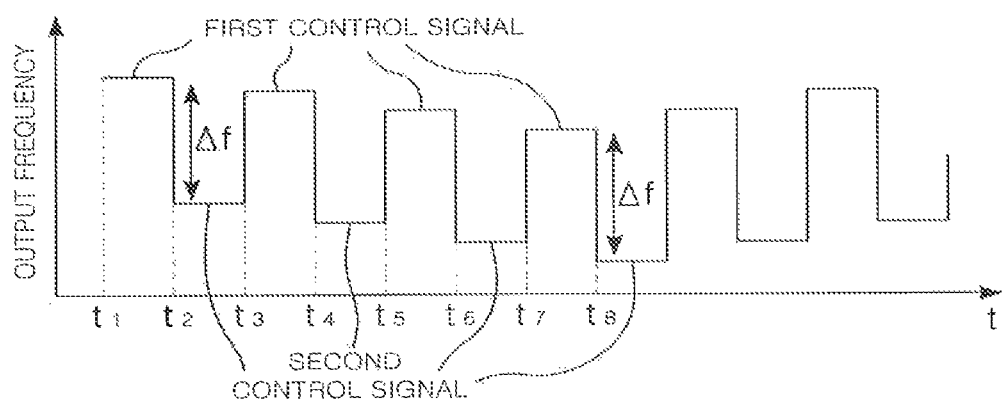
FIG. 6 is a diagram illustrating an output frequency of the voltage-controlled oscillator of the present invention with time.

FIG. 6 is a diagram illustrating the output frequency of the voltage-controlled oscillation of the present invention with time.

A horizontal axis of the graph illustrated in FIG. 6 represents a time, and a vertical axis thereof represents the output frequency generated in the voltage-controlled oscillator.

Referring to FIGS. 5 and 6, when the first control signal is input in times such as t1, t3, t5 and t7, or when the second control signal is input in times such as t2, t4, t6 and t8, absolute values of frequencies output from the voltage-controlled oscillator are not constant. As mentioned above, the reason why the output frequencies of the voltage-controlled oscillator are not constant is because of frequency drift.

The digital signal processor according to the present invention does not use the absolute values of the frequencies output from the voltage-controlled oscillator, and uses the difference value 'Δf' between the first oscillation frequency generated in the voltage-controlled oscillator while the first control signal is input to the detector and the second oscillation frequency generated in the voltage-controlled oscillator while the second control signal is input. Accordingly, it is possible to remove noise due to the frequency drift. Here, the Δf may be a difference value between the output frequencies generated by the difference value ΔV between the control voltage $V_s + \Delta V$ when the first control signal is input and the control signal $V_s$ when the second control signal is input.

Figure 7:
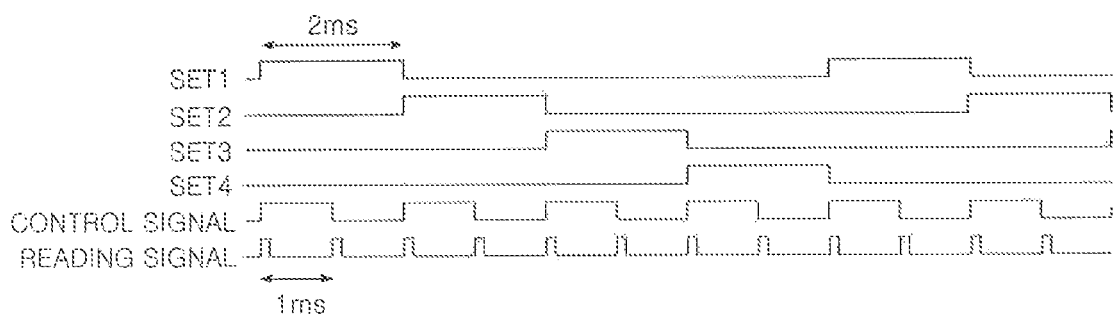
FIG. 7 is a diagram for describing a method for operating an image sensing device according to an embodiment of the present invention.

FIG. 7 is a diagram for describing a method for driving an image sensing device according to an embodiment of the present invention.

A case where the image sensing device includes four pixels and four sets (each having the receiving antenna and the detector) corresponding to the four pixels exist will be described below. However, the number of pixels included in the image sensing device is not limited to the number described above, and may be variously implemented.

Referring to FIGS. 1 and 7, driving signals may be sequentially applied to a set 1, a set 2, a set 3 and a set 4. For example, the respect driving signals may be applied for 2 ms.

The clock generating unit 135 may generate the first control signal and the second control signal for a time during which the set 1, the set 2, the set 3 and the set 4 are operated to input the generated first and second control signals to the detector 130. Here, the first control signal is a signal that allows the DC output voltage by the received terahertz wave signal to be generated, and the second control signal is a signal that does not allow the DC output voltage by the received terahertz wave signal to be generated. The first control signal and the second control signal are respectively applied for 1 ms.

The digital signal processor 160 may read the first oscillation frequency generated in the voltage-controlled oscillator 140 while the first control signal is input to the detector, and may read the second oscillation frequency generated in the voltage-controlled oscillator while the second control signal is input to the detector. For example, the digital signal processor 160 may read the first oscillation frequency generated in the voltage-controlled oscillator 140 within '1 ms' during which the first control signal is input (a reading signal), and may read the second oscillation frequency generated in the voltage-controlled oscillator 140 within '1 ms' during which the second control signal is input (a reading signal). That is, the digital signal processor 160 may read the oscillation frequency every reading signal ('1 ms').

For example, when the first control signal or the second control signal is input to the detector and disappears, or when the reading signal is input, the digital signal processor 160 may read the oscillation frequency generated for last '1 ms'. Specifically, the frequency digital converter 150 may read the oscillation frequency generated in the voltage-controlled oscillator 140 for last '1 ms', and the digital signal processor 160 may read the oscillation frequency signal generated in the frequency digital converter 150.

For example, the digital signal processor 160 may calculate the difference value Δf between the first oscillation frequency and the second oscillation frequency every falling edge of the driving signal applied to the set.

The digital signal processor 160 may generate data on the basis of the difference value between the read first and second oscillation frequencies.

According to the disclosed invention, since the terahertz signal is converted into the frequency signal and the frequency signal is immediately converted into the digital signal, a small-area image sensor can be realized, so that an area of a unit pixel can be reduced. Accordingly, it is possible to realize a high-resolution terahertz image sensing device.

Moreover, since additional equipment such as a lock-in amplifier for high-sensitivity reception is not needed, it is possible to remarkably reduce a size of the device, and it is possible to reduce manufacturing cost.

In addition, a signal output from the detector is converted into a high frequency having not 1/f noise by using the voltage-controlled oscillator, so that it is possible to obtain the output having noise resistance against 1/f noise.

Further, image data is generated on the basis of the difference value between the oscillation frequencies generated according to the control signals input during the driving time, so that the image data may not be affected by the noise that may be generated by the frequency drift generated in the voltage-controlled oscillator even when the input signals are constant.

The described embodiments may be implemented by selectively combining all or a part of the embodiments so as to allow the embodiments to be variously modified.

Furthermore, the embodiments are for the purpose of describing particular embodiments only and are not intended to be limiting of the present invention. In addition, it is to be appreciated to those skilled in the art that various embodiments are possible without departing from the technical spirit of the present invention.

What is claimed is:

1. An image sensing device using frequency conversion for real-time terahertz imaging, the image sensing device comprising:
    a detector configured to detect a terahertz wave signal received by a receiving antenna;
    a voltage-controlled oscillator configured to output an oscillation frequency according to an output voltage of the detector; and
    a frequency digital converter configured to convert the oscillation frequency output from the voltage-controlled oscillator to a digital signal.

2. The image sensing device of claim 1, further comprising:
    a regulator configured to regulate a gain of the voltage-controlled oscillator by regulating the output voltage applied to the voltage-controlled oscillator.

3. The image sensing device of claim 2, wherein the regulator is configured to regulate the output voltage to raise the gain of the voltage-controlled oscillator when it is necessary to increase output sensitivity, and to regulate the output voltage to lower the gain of the voltage-controlled oscillator when it is necessary to reduce noise sensitivity.

4. The image sensing device of claim 2, wherein the gain of the voltage-controlled oscillator is a value of (frequency control range)/(voltage control range).

5. The image sensing device of claim 2, wherein, when the detector is a field effect transistor, a drain of the field effect transistor is connected to the voltage-controlled oscillator, a voltage source which is the regulator is connected between a source of the field effect transistor and a ground, and the gain of the voltage-controlled oscillator is adjusted according to a regulation voltage output from the voltage source.

6. The image sensing device of claim 1, wherein the voltage-controlled oscillator is realized in a ring form in which a plurality of delay cells is connected in series.

7. The image sensing device of claim 1, further comprising:
    a clock generating unit configured to input, to the detector, a first control signal which allows a DC output voltage by the received terahertz wave signal to be generated and a second control signal which does not allow the DC output voltage by the received terahertz wave signal to be generated for a time during which a set having the receiving antenna and the detector is operated; and
    a digital signal processor configured to generate data on the basis of a difference value between a first oscillation frequency generated by the voltage-controlled oscillator while the first control signal is input to the detector and a second oscillating frequency generated by the voltage-controlled oscillator while the second control signal is input to the detector.

8. A focal plane array imaging device using frequency conversion for real-time terahertz imaging, the focal plane array imaging device comprising:
    an antenna-detector array in which a plurality of sets each having a receiving antenna configured to receive a terahertz wave signal and a detector configured to detect the terahertz wave signal received by the receiving antenna is arranged;
    column and row drivers that are able to turn on/off at least one of the plurality of sets;
    a voltage-controlled oscillator configured to output an oscillation frequency according to an output voltage from the set;
    a frequency digital converter configured to convert the oscillation frequency output from the voltage-controlled oscillator to a digital signal; and
    a digital signal processor configured to generate data on the basis of the converted digital signal.

9. The focal plane array imaging device of claim 8, further comprising:
    a clock generating unit configured to generate clocks for operations of circuits included in the focal plane array imaging device, and to control operation timings of the respective circuits.

10. The focal plane array imaging device of claim 9, wherein the clock generating unit is configured to input, to the detector included in a single set, a first control signal which allows a DC output voltage by the received terahertz wave signal to be generated and a second control signal which does not allow the DC output voltage by the received terahertz wave signal to be generated for a time during which the single set is operated, and
    the digital signal processor is configured to generate data on the basis of a difference value between a first oscillation frequency generated by the voltage-controlled oscillator while the first control signal is input to the detector and a second oscillating frequency generated by the voltage-controlled oscillator while the second control signal is input to the detector.

11. The focal plane array imaging device of claim 10, wherein when the detector is a field effect transistor, the first control signal and the second control signal are bias voltages.

12. The focal plane array imaging device of claim 8, further comprising:
    a regulator configured to be able to regulate a gain of the voltage-controlled oscillator by regulating the output voltage applied to the voltage-controlled oscillator.

13. The focal plane array imaging device of claim 12, wherein the regulator is configured to regulate the output voltage to raise the gain of the voltage-controlled oscillator when it is necessary to increase output sensitivity, and to regulate the output voltage to lower the gain of the voltage-controlled oscillator when it is necessary to reduce noise sensitivity.

14. The focal plane array imaging device of claim 12, wherein the gain of the voltage-controlled oscillator is a value of frequency control range)/(voltage control range).

15. The focal plane array imaging device of claim 12, wherein when the detector is a field effect transistor, a drain of the field effect transistor is connected to the voltage-controlled oscillator, a voltage source which is the regulator is connected between a source of the field effect transistor and a ground, and the gain of the voltage-controlled oscillator is adjusted according to a regulate voltage output from the voltage source.

* * * * *